(12) United States Patent
Patel et al.

(10) Patent No.: US 11,787,361 B1
(45) Date of Patent: Oct. 17, 2023

(54) SELECTIVELY INFLATABLE AIRBAG SIDE CHAMBERS

(71) Applicant: Ford Global Technologies, LLC, Dearborn, MI (US)

(72) Inventors: Deepak Patel, Canton, MI (US); Zhibing Deng, Northville, MI (US); Joseph E. Abramczyk, Farmington Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 18/066,512

(22) Filed: Dec. 15, 2022

(51) Int. Cl.
*B60R 21/207* (2006.01)
*B60R 21/231* (2011.01)
*B60R 21/2338* (2011.01)

(52) U.S. Cl.
CPC ...... *B60R 21/207* (2013.01); *B60R 21/23138* (2013.01); *B60R 2021/23146* (2013.01); *B60R 2021/23161* (2013.01); *B60R 2021/23384* (2013.01)

(58) Field of Classification Search
CPC ............ B60R 21/207; B60R 21/23138; B60R 2021/23146; B60R 21/2338; B60R 2021/23384
See application file for complete search history.

(56) References Cited

U.S. PATENT DOCUMENTS

| | | | |
|---|---|---|---|
| 6,962,363 B2 | 11/2005 | Wang et al. | |
| 7,543,850 B2 | 6/2009 | Bachraty et al. | |
| 9,403,500 B2 | 8/2016 | Ishida et al. | |
| 9,469,268 B2 * | 10/2016 | Sugimoto | B60R 21/237 |
| 10,377,337 B2 * | 8/2019 | Kunisada | B60R 21/207 |
| 10,486,638 B2 * | 11/2019 | Kwon | B60R 21/2338 |
| 10,870,405 B2 * | 12/2020 | Kwon | B60R 21/207 |
| 11,091,114 B2 * | 8/2021 | Komura | B60R 21/23138 |
| 11,130,463 B2 * | 9/2021 | Parker | B60R 21/23138 |
| 11,148,628 B1 * | 10/2021 | Thomas | B60R 21/01532 |
| 11,161,473 B2 * | 11/2021 | Deng | B60R 21/233 |
| 11,267,427 B1 * | 3/2022 | Deng | B60R 21/207 |
| 11,292,419 B2 * | 4/2022 | Wiik | B60R 21/23138 |
| 11,407,376 B2 * | 8/2022 | Moon | B60R 21/2338 |
| 11,505,158 B2 * | 11/2022 | Choi | B60R 21/23138 |
| 11,634,098 B1 * | 4/2023 | Line | B60N 2/79 280/730.2 |
| 2019/0054890 A1 * | 2/2019 | Kwon | B60R 21/2338 |

(Continued)

FOREIGN PATENT DOCUMENTS

| | | |
|---|---|---|
| JP | 6614890 B2 | 12/2019 |
| WO | 2021204228 A1 | 10/2021 |

*Primary Examiner* — Faye M Fleming
(74) *Attorney, Agent, or Firm* — Frank A. MacKenzie; Bejin Bieneman PLC

(57) ABSTRACT

An assembly includes a vehicle seat. The assembly includes an airbag supported by the vehicle seat and inflatable to an inflated position. The airbag includes a main chamber, a first side chamber, and second side chamber spaced downwardly from the first side chamber. The assembly includes a computer including a processor and a memory storing instructions executable by the processor to determine a size of an occupant seated in the vehicle seat and, based on the size of the occupant, selectively inflate one of the first side chamber from an uninflated position to an inflated position or the second side chamber from an uninflated position to an inflated position.

16 Claims, 7 Drawing Sheets

(56) References Cited

U.S. PATENT DOCUMENTS

| 2021/0170978 A1* | 6/2021 | Acker | B60R 21/23138 |
| 2021/0197749 A1* | 7/2021 | Wiik | B60R 21/207 |
| 2023/0128759 A1* | 4/2023 | Deng | B60R 21/23138 |
| | | | 280/743.2 |

* cited by examiner

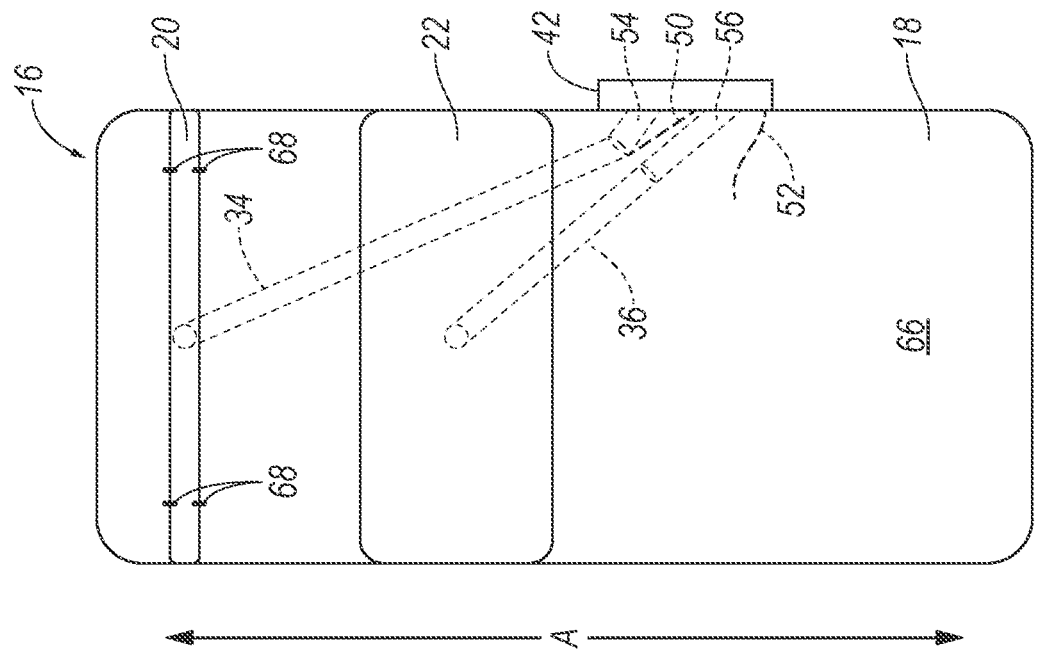
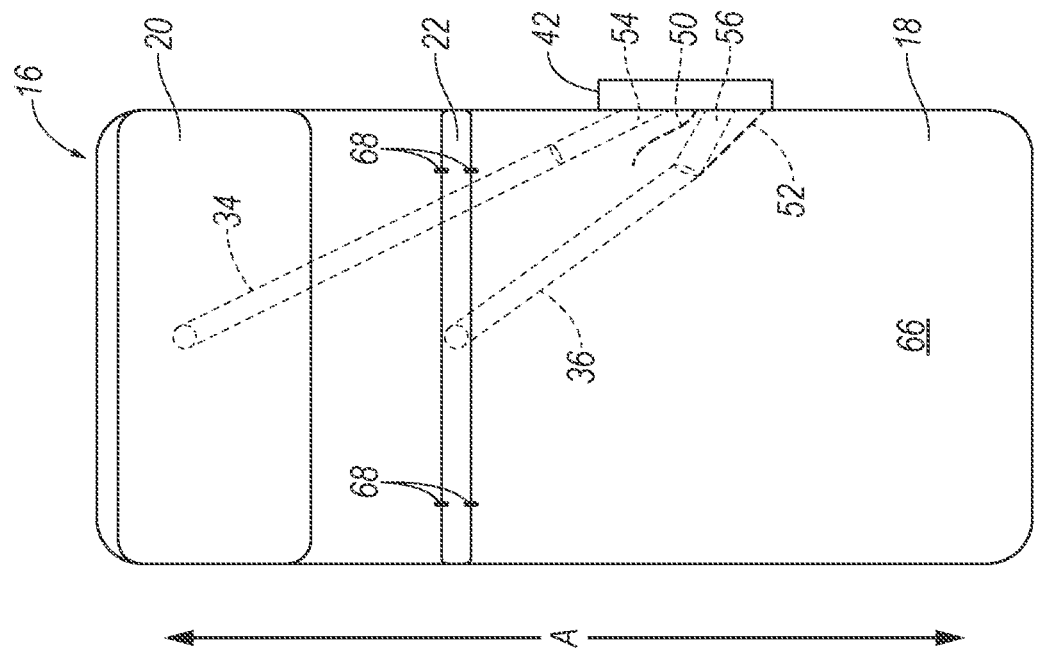

SELECTIVELY INFLATABLE AIRBAG SIDE CHAMBERS

BACKGROUND

A side airbag is mounted to a seatback and is inflatable along a side of an occupant, specifically along the torso and/or hip of the occupant. The side airbag, for example, may be inflatable between the occupant and a vehicle door. The side airbag controls the kinematics of the occupant in certain vehicle impacts that urge the occupant in a cross-vehicle direction, e.g., a certain side impact.

BRIEF DESCRIPTION OF THE DRAWINGS

FIG. 4A is a side view of the airbag with a first side chamber in the inflated position.

FIG. 4B is a side view of the airbag with the second side chamber in the inflated position.

DETAILED DESCRIPTION

Figure 1:
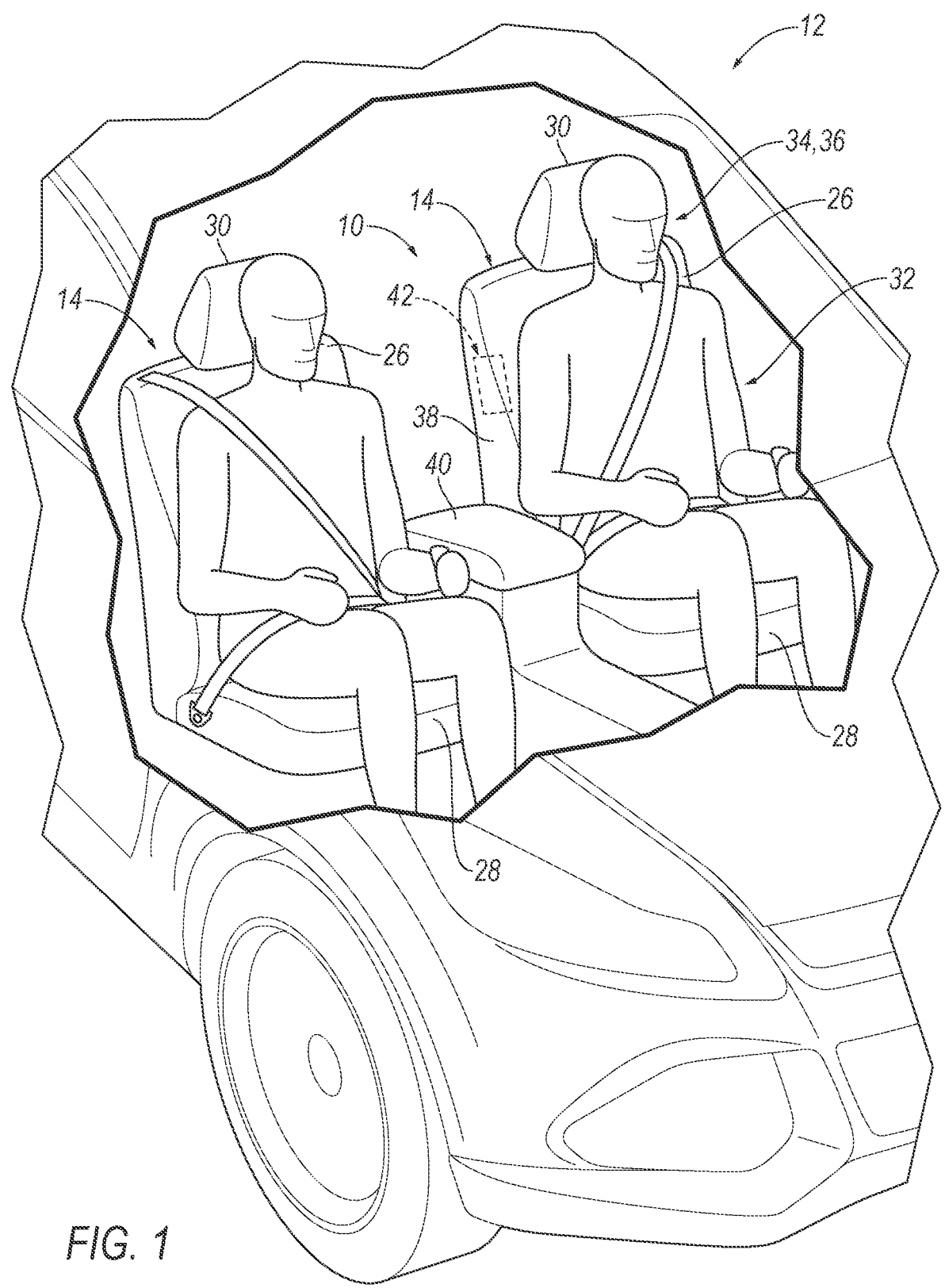
FIG. 1 is a perspective view of a vehicle having a plurality of seats.

An assembly includes a vehicle seat. The assembly includes an airbag supported by the vehicle seat and inflatable to an inflated position. The airbag includes a main chamber, a first side chamber, and second side chamber spaced downwardly from the first side chamber. The assembly includes a computer including a processor and a memory storing instructions executable by the processor to determine a size of an occupant seated in the vehicle seat and, based on the size of the occupant, selectively inflate one of the first side chamber from an uninflated position to an inflated position or the second side chamber from an uninflated position to an inflated position.

The assembly may include an inflator in fluid communication with the main chamber, the first side chamber, and the second side chamber.

The assembly may include a first tether between the inflator and the first side chamber and a second tether between the inflator and the second side chamber. The first tether and the second tether each may be selectively releasable.

The instruction may further include to identify certain vehicle impacts and, based the identification of the vehicle impact, selectively release either the first tether or the second tether.

The assembly may include a first tether release coupled to the first tether and a second tether release coupled to the second tether. The instructions may further include to, based on the size of the occupant, selectively activate either one of the first tether release or the second tether release.

The assembly may include a first tunnel between the inflator and the first side chamber and a second tunnel between the inflator and the second side chamber. The first tether may be coupled to the first tunnel and the second tether may be coupled to the second tunnel.

The first side chamber and the second side chamber may be seat-inboard of the main chamber when the first side chamber or the second side chamber are in the inflated position.

The main chamber may be elongated along an axis in the inflated position. The first side chamber and the second side chamber may be spaced from each other along the axis.

The first side chamber and the second side chamber may be inflatable transverse to the axis.

The first side chamber and the second side chamber may be inflatable away from the main chamber.

The first side chamber is in the inflated position when the second side chamber is in the uninflated position and the second side chamber is in the inflated position when the first side chamber is in the uninflated position.

The vehicle seat may define an occupant seating area. The first side chamber and the second side chamber may be inflatable between the main chamber and the occupant seating area.

The vehicle seat may include a pair of bolsters spaced cross-seat from each other and the occupant seating area being between the bolsters. The airbag may be supported at one of the bolsters.

The vehicle seat may define a first occupant head area and a second occupant head area. The first side chamber may be inflatable between the main chamber and the first occupant head area and the second side chamber may be inflatable between the main chamber and the second occupant head area.

The vehicle seat may include a seatback with the airbag being supported by the seatback.

The assembly may include a second vehicle seat spaced cross-vehicle from the vehicle seat. The airbag may be inflatable between the vehicle seat and the second vehicle seat.

With reference to the Figures, wherein like numerals indicate like parts throughout the several views, an assembly 10 for a vehicle 12 includes a vehicle seat 14. The assembly 10 includes an airbag 16 supported by the vehicle seat 14 and inflatable to an inflated position. The airbag 16 includes a main chamber 18, a first side chamber 20, and second side chamber 22 spaced downwardly from the first side chamber 20. The assembly 10 includes a computer 24 including a processor and a memory storing instructions executable by the processor to determine a size of an occupant seated in the vehicle seat 14 and, based on the size of the occupant, selectively inflate one of the first side chamber 20 from an uninflated position to an inflated position or the second side chamber 22 from an uninflated position to an inflated position.

In the event of certain impacts to the vehicle 12, for example, certain far-side impacts, the airbag 16 inflates to the inflated position. The airbag 16 may control the kinematics of an occupant in the event of the certain impact. Based on the size of an occupant, the first side chamber 20 and the second side chamber 22 is selectively inflated. The side chambers 20, 22, depending on which is in the inflated position, are inflatable adjacent the head of the occupant to control the kinematics of the head in the event of certain impacts. Because the side chambers 20, 22 are selectively inflatable, the side chambers 20, 22 may control the kinematics of occupants of multiple sizes that may be seated in the seat 14.

Figure 2:
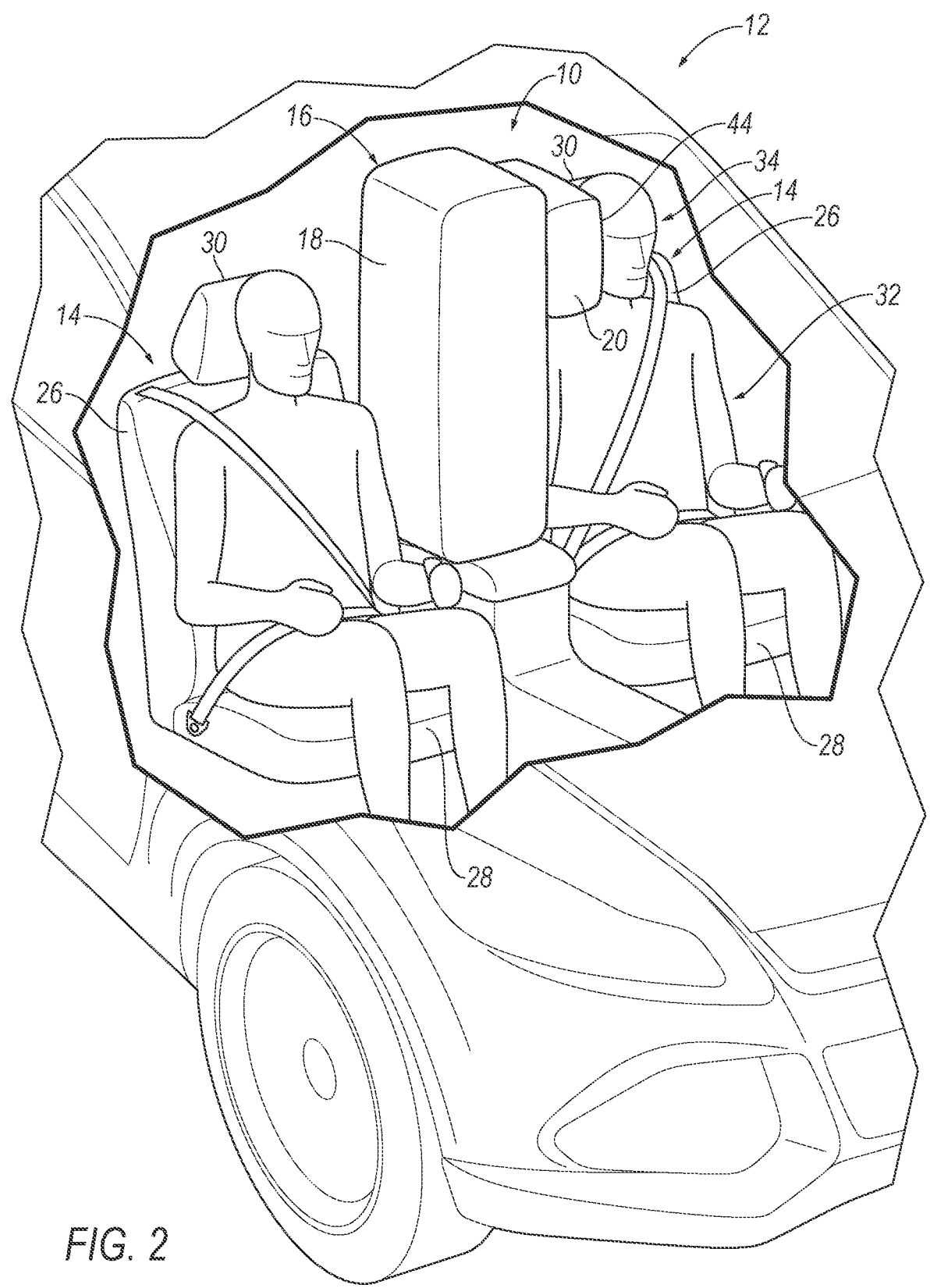
FIG. 2 is a perspective view of the vehicle having an airbag supported by one of the seats with the airbag having a first side chamber in an inflated position.
Figure 3:
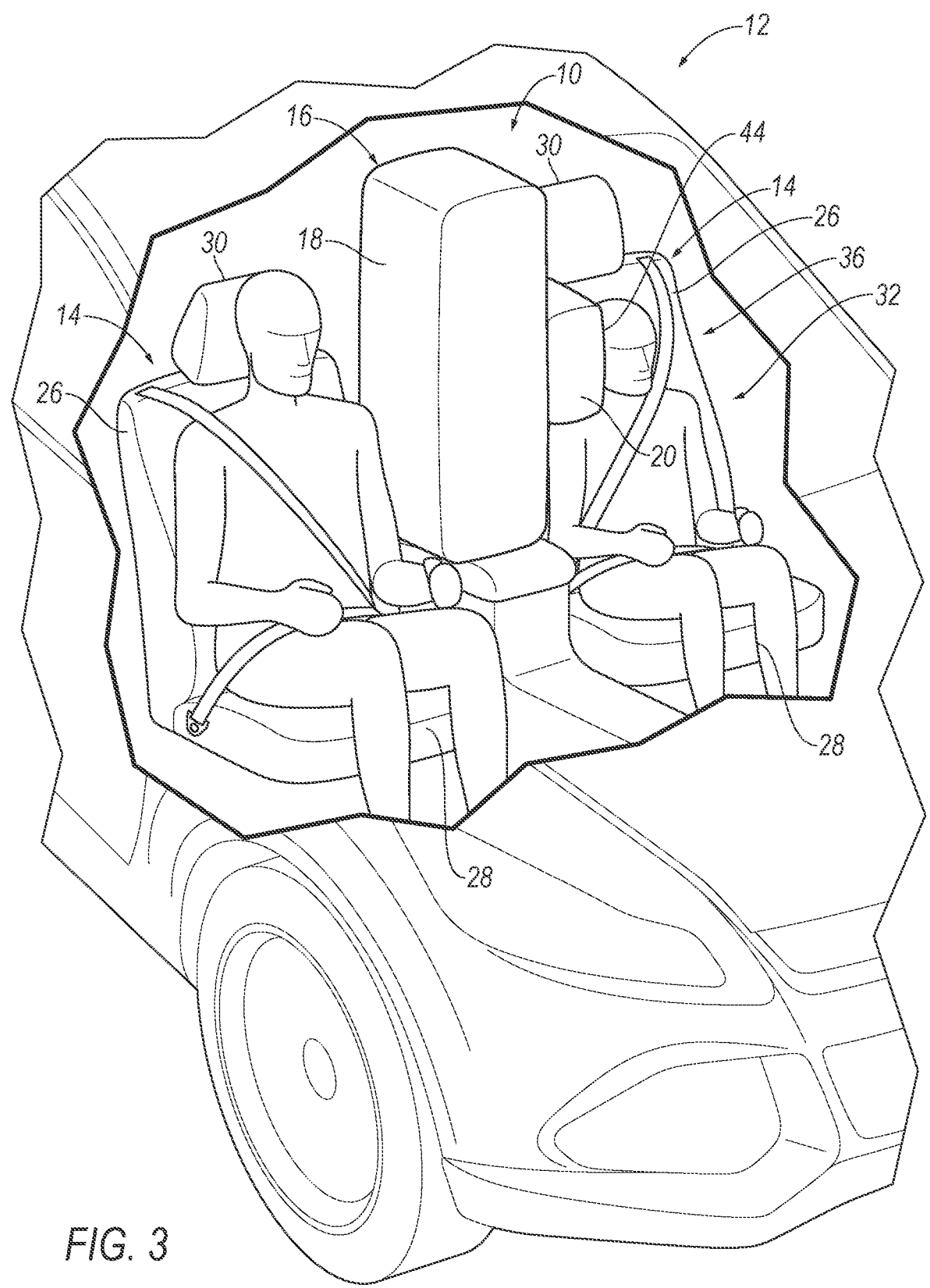
FIG. 3 is a perspective view of the vehicle having the airbag supported by one of the seats with the airbag having a second side chamber in an inflated position.
Figures 5A, 5B:
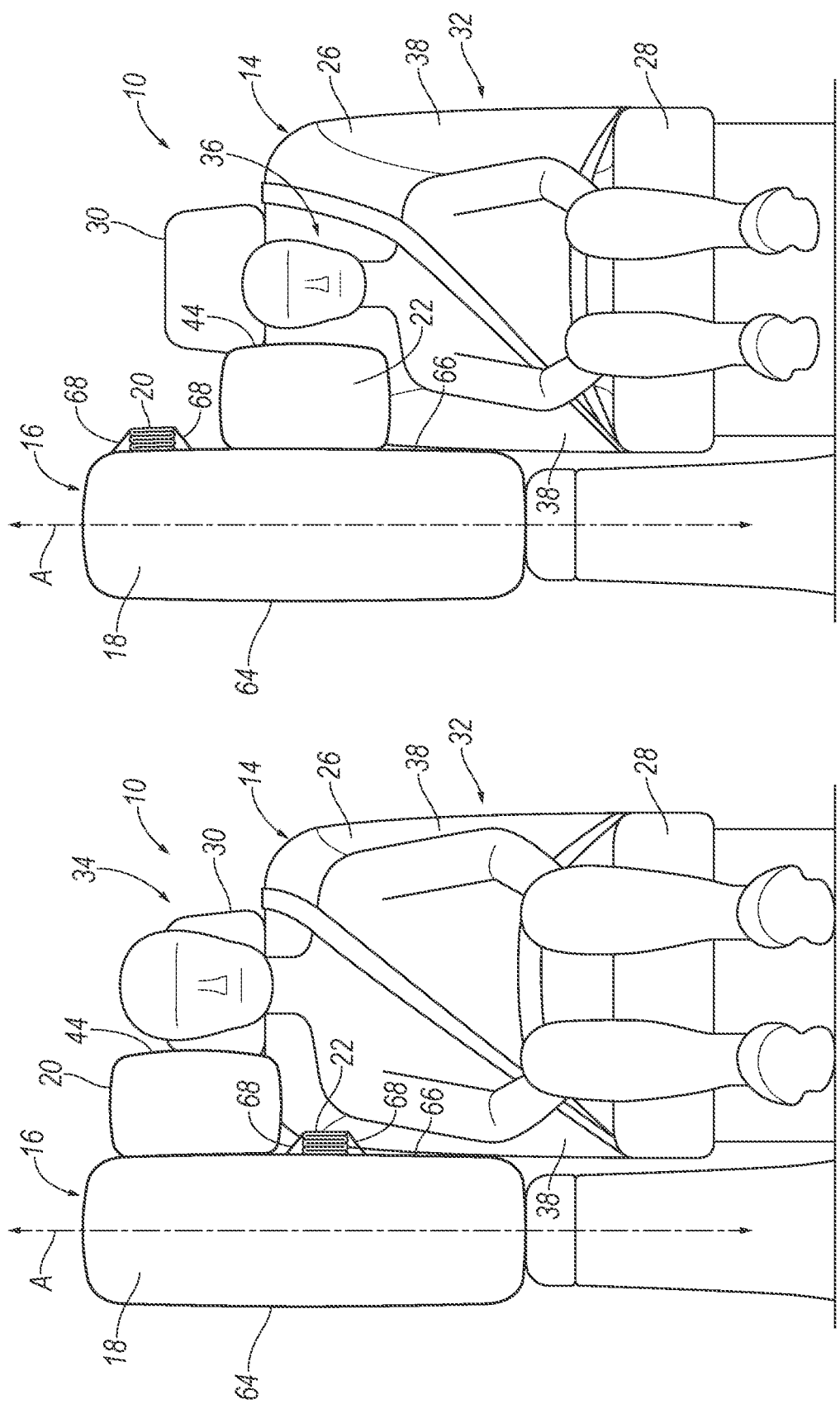
FIG. 5A is a frontal view of the seat with the airbag having the first side chamber in the inflated position.
FIG. 5B is a frontal view of the seat with the airbag having the second side chamber in the inflated position.

With reference to FIGS. 1-3, the vehicle 12 may be any suitable type of ground vehicle, e.g., a passenger or commercial automobile such as a sedan, a coupe, a truck, a sport utility, a crossover, a van, a minivan, a taxi, a bus, etc. The vehicle 12 includes a vehicle body (not numbered) including rockers, roof rails, pillars, body panels, etc.

The vehicle 12 includes a passenger compartment (not numbered) to house occupants, if any, of the vehicle 12. The passenger compartment may extend across the vehicle 12, i.e., from one side to the other side of the vehicle 12. The passenger compartment includes a front end and a rear end with the front end being in front of the rear end during forward movement of the vehicle 12.

With continued reference to FIGS. 1-3, the vehicle 12 includes one or more seats 14. Specifically, the vehicle 12 may include any suitable number of seats 14. The seats 14 are supported by a vehicle 12 floor (not numbered). The seats 14 may be arranged in any suitable arrangement in the passenger compartment. As in the example shown in the Figures, one or more of the seats 14 may be at the front end of the passenger compartment that are spaced cross-vehicle from each other, e.g., a driver seat and/or a passenger seat. For example, the vehicle 12 may include a first seat 14 and a second seat 14 spaced cross-vehicle from the first seat 14. In other examples, one or more of the seats 14 may be behind the front end of the passenger compartment, e.g., at the rear end of the passenger compartment. The seats 14 may be movable relative to the vehicle 12 floor to various positions, e.g., movable fore-and-aft and/or cross-vehicle. The seat 14 may be of any suitable type, e.g., a bucket seat.

The seats 14 include a seatback 26, a seat bottom 28, and a head restraint 30. The head restraint 30 may be supported by and extending upwardly from the seatback 26. The head restraint 30 may be stationary or movable relative to the seatback 26. The seatback 26 may be supported by the seat bottom 28 and may be stationary or movable relative to the seat bottom 28. The seatback 26, the seat bottom 28, and the head restraint 30 may be adjustable in multiple degrees of freedom. Specifically, the seatback 26, the seat bottom 28, and the head restraint 30 may themselves be adjustable. In other words, adjustable components within the seatback 26, the seat bottom 28, and the head restraint 30 may be adjustable relative to each other.

The seatback 26 includes a seat frame (not shown) and a covering (not numbered) supported on the seat frame. The seat frame may include tubes, beams, etc. Specifically, the seat frame includes a pair of upright frame members. The upright frame members are elongated, and specifically, are elongated in a generally upright direction when the seatback 26 is in a generally upright position. The upright frame members are spaced from each other and the seat frame includes one or move cross-members extending between the upright frame members. The seat frame, including the upright frame members, may be of any suitable plastic material, e.g., carbon fiber reinforced plastic (CFRP), glass fiber-reinforced semi-finished thermoplastic composite (organosheet), etc. As another example, some or all components of the seat frame may be formed of a suitable metal, e.g., steel, aluminum, etc.

The covering may include upholstery, padding, and/or plastic portions. The upholstery may be cloth, leather, faux leather, or any other suitable material. The upholstery may be stitched in panels around the seat frame. The padding may be between the covering and the seat frame and may be foam or any other suitable material.

The seatback 26 and the seat bottom 28 of each of the seats 14 define an occupant seating area 32 of the seats 14. The occupant seating area 32 is the area occupied by an occupant when properly seated on the seat bottom 28 and the seatback 26. The occupant seating area 32 is in a seat-forward direction of the seatback 26 and above the seat bottom 28. In the example shown in the Figures, the occupant seating area 32 faces the front end of the passenger compartment when the seat 14 is in the forward-facing position and the occupant seating area 32 faces the rear end of the passenger compartment when the seat 14 is in the rearward-facing position.

With reference to FIGS. 1-3 and FIGS. 5A and 5B, each of the seats 14 defines one or more occupant head areas 34, 36. The locations of the occupant head area 34, 36 may depend on the size of an occupant seated in the seat 14. For example, the seat 14 shown in the Figures defines a first occupant head area 34 for a taller occupant and a second occupant head area 36 for a shorter occupant. The occupant head areas 34, 36 are vehicle-forward of the head restraint 30 of the seats 14. The occupant head areas 34, 36 are the volumes typically occupied by the head of an occupant of multiple sizes properly seated in the seats 14 of the vehicle 12. The occupant seating area 32 may include the first occupant head area 34 for some occupants while the occupant seating area 32 may include the second occupant head area 36 for other occupants.

The seatback 26 of the seat 14 may include a pair of bolsters 38 on opposite sides of the occupant seating area 32, i.e., the occupant seating area 32 is between the bolsters 38. The bolsters 38 are spaced cross-seat from each other. The bolsters 38 are elongated, and specifically, are elongated in a generally upright direction when the seatback 26 is in a generally upright position. The bolsters 38 define cross-seat boundaries of the seatback 26, i.e., the seatback 26 terminates at the bolsters 38. The bolsters 38 may extend in a seat-forward direction relative to the occupant seating area 32, i.e., on opposite sides of the torso and shoulders of an occupant seated on the seat 14. The extension of the bolsters 38 relative to the occupant seating area 32 may be defined by the upright frame members and/or the covering. In the example shown in the Figures, the size and shape of both the upright frame members and the covering form the bolsters 38.

With reference to FIGS. 1-5B, the assembly 10 includes an airbag assembly 40. The airbag assembly 40 includes the airbag 16, an inflator 42, and may include a housing (not shown). The airbag assembly 40, e.g., the airbag 16, is supported by the at least one of the seats 14. The airbag 16 is supported by the seatback 26 of the seat 14. Specifically, the airbag 16 may be supported at one of the bolsters 38 of the seat 14. The airbag 16 may be supported by the seat frame of the seatback 26 of one of the seats 14. The airbag 16 is supported by a vehicle-inboard side of the seat frame. The airbag 16 is inflatable from an uninflated position to the inflated position between the seats 14. In other words, the airbag 16 is between the seats 14 when the airbag 16 is in the inflated position. The seats 14 are vehicle-outboard of the airbag 16.

With continued reference to FIGS. 2-5B, the airbag 16 includes a plurality of chambers 18, 20, 22. Specifically, the airbag 16 includes the main chamber 18, the first side chamber 20 and the second side chamber 22. As discussed above, the airbag 16 is between the seats 14 in the inflated position. Specifically, the main chamber 18 and the side chambers 20, 22 are between the seats 14. The airbag 16 controls the kinematics of occupants seated in the seats 14 in the event of certain impacts to the vehicle 12.

The main chamber 18 is elongated along the seatback 26 in the inflated position. Specifically, the main chamber 18 is elongated along an axis A that is elongated along the seatback 26 of the seat 14. The main chamber 18 is vehicle-inboard of the seat 14 in the inflated position. In other words, the main chamber 18 is vehicle-inboard of the occupant seating area 32 and the occupant head areas 34, 36. The main chamber 18 includes a seat-outboard panel 64 spaced from the seat 14 and a seat-inboard panel 66 between the seat-outboard panel 64 and the occupant seating area 32 of the seat 14.

With reference to FIGS. 4A and 4B, the first side chamber 20 and the second side chamber 22 are selectively inflatable from uninflated positions to inflated positions. The first side chamber 20 and the second side chamber 22 are supported by the main chamber 18. Specifically, the first side chamber 20 and the second side chamber 22 are supported by the seat-inboard panel 66 of the main chamber 18. In other words, the first side chamber 20 and the second side chamber 22 are seat-inboard of the main chamber 18. Each of the side chambers 20, 22 is attached to the main chamber 18. In the inflated positions, the side chambers 20, 22 are elongated from the seat-inboard panel 66 to distal ends 44 spaced from the seat-inboard panel 66.

The first side chamber 20 and the second side chamber 22 are spaced from each other along the main chamber 18. Specifically, the first side chamber 20 and the second side chamber 22 are spaced from each other along the seat-inboard panel 66 of the main chamber 18. The second side chamber 22 is spaced downwardly from the first side chamber 20 along the main chamber 18, e.g., the seat-inboard panel 66 of the main chamber 18.

As discussed above, the first side chamber 20 and the second side chamber 22 are selectively inflatable from uninflated positions to inflated positions. Specifically, the first side chamber 20 and the second side chamber 22 are selectively inflatable based on a determination of the size of an occupant seated in the seat 14. For example, if a taller occupant is determined to be sitting in the seat 14, the first side chamber 20 inflates to the inflated position. As another example, if a shorter occupant is determined to be sitting in the seat 14, the second side chamber 22 inflates to the inflated position. The first side chamber 20 is in the inflated position when the second side chamber 22 is in the uninflated position and the second side chamber 22 is in the inflated position when the first side chamber 20 is in the uninflated position. In other words, one of the side chambers 20, 22 is inflated when the other of the side chambers 20, 22 is uninflated. Stitches 68 that are frangible relative to the airbag 16 may extend through the side chambers 20, 22 and the seat-inboard panel 66 when the side chambers 20, 22 are in the uninflated positions. When either of the side chambers 20, 22 are selected for inflation, the stitches 68 may break to allow the selected side chamber 20, 22 to inflate to the inflated position.

The first side chamber 20 and the second side chamber 22 are inflatable transverse to the axis A. For example, the first side chamber 20 and the second side chamber 22 are inflatable perpendicular to the axis A. The first side chamber 20 and the second side chamber 22 are inflatable away from the main chamber 18 toward the occupant seating area 32. Specifically, the first side chamber 20 and the second side chamber 22 are inflatable away from the seat-inboard panel 66 of the main chamber 18 toward the occupant seating area 32. The first side chamber 20 and the second side chamber 22 are seat-inboard of the main chamber 18 when the first side chamber 20 or the second side chamber 22 are in the inflated position.

The first side chamber 20 and the second side chamber 22 are inflatable between the main chamber 18 and the occupant seating area 32. The first side chamber 20 is inflatable toward the first occupant head area 34 and the second side chamber 22 is inflatable toward the second occupant head area 36. The first side chamber 20 and the second side chamber 22 are inflatable adjacent the head of an occupant seated in the seat 14. Specifically, the first side chamber 20 is inflatable between the main chamber 18 and the first occupant head area 34 and the second side chamber 22 is inflatable between the main chamber 18 and the second occupant head area 36. As the side chambers 20, 22 inflate toward the occupant head areas 34, 36, the distal ends 44 of the side chambers 20, 22 move away from the main chamber 18 and toward the occupant head areas 34, 36.

The inflator 42 is in fluid communication with the airbag 16. Specifically, the inflator 42 is in fluid communication with the main chamber 18, the first side chamber 20, and the second side chamber 22. The inflator 42 expands the airbag 16 with inflation medium, such as a gas, to move the airbag 16 from the uninflated position to the inflated position. Specifically, the airbag 16 includes an inflation chamber extending through the main chamber 18, the first side chamber 20, and the second side chamber 22 and the inflator 42 expands the inflation chamber (i.e., the main chamber 18 and one of the first side chamber 20 and the second side chamber 22). The inflator 42 may be supported by any suitable component. For example, the inflator 42 may be supported by the housing of the airbag assembly 40. The inflator 42 may be, for example, a pyrotechnic inflator that ignites a chemical reaction to generate the inflation medium, a stored gas inflator that releases e.g., by a pyrotechnic valve stored gas as the inflation medium, or a hybrid. The inflator 42 may be, for example, at least partially in the inflation chamber of the airbag 16 to deliver inflation medium directly to the inflation chamber or may be connected to the inflation chamber through, as described below, fill tubes, diffusers, etc.

With continued reference to FIGS. 4A and 4B, the assembly 10 includes one or more tunnels 46, 48 between the inflator 42 and the side chambers 20, 22. The tunnels 46, 48 allow inflation medium to flow from the inflator 42 to the side chambers 20, 22 depending on which of the side chambers 20, 22 is selected to be inflated. For example, the assembly 10 includes a first tunnel 46 between the inflator 42 and the first side chamber 20 and a second tunnel 48 between the inflator 42 and the second side chamber 22. Depending on which of the side chambers 20, 22 is inflating based on the size of the occupant in the seat 14, inflation medium passes from the inflator 42 through the tunnel 46, 48 to inflate the side chambers 20, 22 to the inflated position.

The airbag 16 and the tunnels 46, 48 may be fabric, e.g., a woven polymer. As an example, the airbag 16 may be woven nylon yarn, for example, nylon 6, 6. Other examples of woven polymers include polyether ether ketone PEEK, polyetherketoneketone PEKK, polyester, etc. The woven polymer may include a coating, such as silicone, neoprene, urethane, etc. For example, the coating may be polyorgano siloxane.

The assembly 10 includes one or more tethers 50, 52 between the inflator 42 and the side chambers 20, 22. For example, the assembly 10 includes a first tether 50 between the inflator 42 and the first side chamber 20 and a second tether 52 between the inflator 42 and the second side chamber 22. The tethers 50, 52 may be coupled to the tunnels 46, 48 to limit flow of the inflation medium to the first side chamber 20 and the second side chamber 22. Specifically, the first tether 50 is coupled to the first tunnel 46 and the second tether 52 is coupled to the second tunnel 48.

The first tether 50 and the second tether 52 each is selectively releasable. In other words, depending on which of the side chambers 20, 22 is to inflate, the first tether 50 or the second tether 52 will release to allow inflation medium to flow into the selected side chamber 20, 22. For example, if the first side chamber 20 is to inflate, the first tether 50 is released from the first tunnel 46 to allow inflation medium to flow to the first side chamber 20. As another example, if the second side chamber 22 is to inflate, the second tether 52 is released from the second tunnel 48 to allow inflation medium to flow to the second side chamber 22.

The tethers 50, 52 are releasable relative to the tunnels 46, 48. Specifically, the tethers 50, 52 are coupled to the tunnels 46, 48 in such a way that the tether 50, 52 is releasable to allow inflation medium to flow into the selected side chamber 20, 22. The tethers 50, 52 may be coupled to the tunnels 46, 48 in any suitable, releasable way. For example, the tethers 50, 52 may be wrapped around the tunnels 46, 48 and, when the selected side chamber 20, 22 is to inflate, the wrapping of the respective tether 50, 52 is released. In other examples, the tethers 50, 52 may be releasably tied to the tunnels 46, 48 and, when the selected side chamber 20, 22 is to inflate, the tied portion of the respective tether 50, 52 is released to allow inflation medium to inflate the selected side chamber 20, 22. As yet another example, the tethers 50, 52 may be coupled to a valve (not shown), for example, an obstruction in the tunnels 46, 48 made of the same material as the airbag 16, that is released to allow the inflation medium to inflate the selected side chamber 20, 22. The tethers 50, 52 may be coupled in any other suitable way to the tunnels 46, 48 such that the inflation medium is suppressed from inflating the side chamber 20, 22 that is not selected and to allow inflation medium to flow to the side chamber 20, 22 that is selected when the respective tether 50, 52 is released.

The assembly 10 includes one or more a tether releases 54, 56 coupled to the tethers 50, 52. The first tether 50 and the second tether 52 are selectively releasable by one or more of the tether releases 54, 56. In other words, the tether releases 54, 56 are selectively activatable to selectively release the first tether 50 and the second tether 52. For example, the assembly 10 may include a first tether release 54 coupled to the first tether 50 to release the first tether 50 and a second tether release 56 coupled to the second tether 52 to release the second tether 52. In other examples, the assembly 10 may include a single tether release couple to both the first tether 50 and the second tether 52. The single tether release may selectively release each of the first tether 50 and the second tether 52. The tether releases 54, 56 activates to release one of the tethers 50, 52 based on the size of the occupant seated in the seat 14. The tether releases 54, 56 will not activate if the respective side chamber 20, 22 will not inflate.

The tether releases 54, 56 may supported by the seatback 26 of the seat 14. Specifically, the tether releases 54, 56 may be supported by seat frame of the seatback 26. In some examples, the tether releases 54, 56 may be in the housing of the airbag assembly 40. The tether releases 54, 56 may be supported by any suitable component of the vehicle 12 or seat 14.

As an example, the tether releases 54, 56 may be a cutter that cuts one or more of the tethers 50, 52. As another example, the tether releases 54, 56 may be a clamp that releases the tether. As yet another example, the tether releases 54, 56 may include releasable posts (not shown) that is coupled to the tethers 50, 52. In such an example, the releasable post is released to allow the tethers 50, 52 to release. The tether releases 54, 56 may be any suitable type of tether releases 54, 56 to release the tether. The tether releases 54, 56 may be pyrotechnically actuated, i.e., the tether releases 54, 56 may include a pyrotechnic device that cuts the tethers 50, 52, releases the end of the tethers 50, 52, releases the releasable posts to release the tethers 50, 52, etc.

Figure 6:
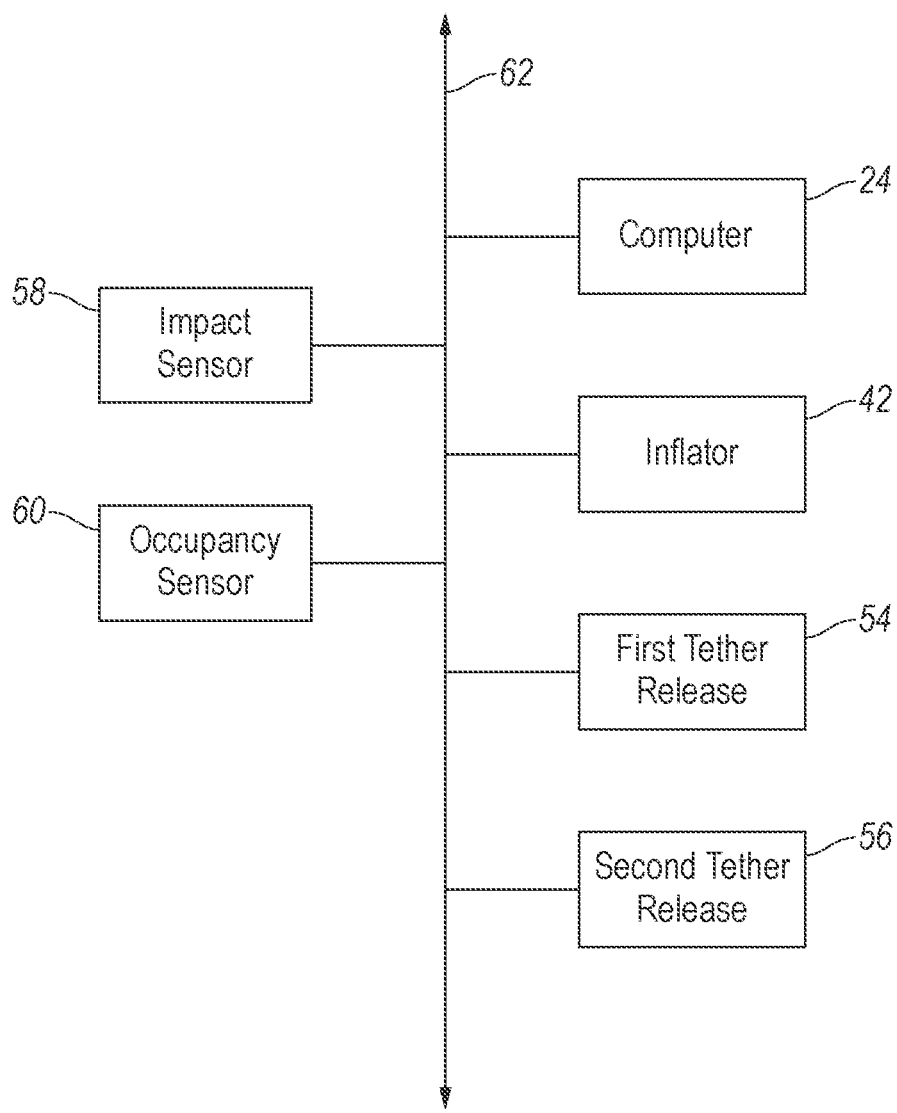
FIG. 6 is a block diagram of a vehicle communication network for the vehicle.

With reference to FIG. 6, the vehicle 12 includes the computer 24. The computer 24 includes a processor and a memory. The memory includes one or more forms of computer 24 readable media, and stores instructions executable by the computer 24 for performing various operations, including as disclosed herein. For example, the computer 24 may be a restraints control module (RCM). The computer 24 can be a generic computer with a processor and memory as described above and/or may include an electronic control unit ECU or controller for a specific function or set of functions, and/or a dedicated electronic circuit including an ASIC (application specific integrated circuit) that is manufactured for a particular operation, e.g., an ASIC for processing sensor data and/or communicating the sensor data. In another example, the computer 24 may include an FPGA (Field-Programmable Gate Array) which is an integrated circuit manufactured to be configurable by a user. Typically, a hardware description language such as VHDL (Very High-Speed Integrated Circuit Hardware Description Language) is used in electronic design automation to describe digital and mixed-signal systems such as FPGA and ASIC. For example, an ASIC is manufactured based on VHDL programming provided pre-manufacturing, whereas logical components inside an FPGA may be configured based on VHDL programming, e.g. stored in a memory electrically connected to the FPGA circuit. In some examples, a combination of processor(s), ASIC(s), and/or FPGA circuits may be included in a computer 24.

The memory can be of any type, e.g., hard disk drives, solid state drives, servers, or any volatile or non-volatile media. The memory can store the collected data sent from the sensors. The memory can be a separate device from the computer 24, and the computer 24 can retrieve information stored by the memory via a network in the vehicle 12, e.g., over a CAN bus, a wireless network, etc. Alternatively or additionally, the memory can be part of the computer 24, e.g., as a memory of the computer 24.

With continued reference to FIG. 6, the computer 24 is generally arranged for communications on a vehicle communication network 62 that can include a bus in the vehicle 12 such as a controller area network CAN or the like, and/or other wired and/or wireless mechanisms. Alternatively or additionally, in cases where the computer 24 actually comprises a plurality of devices, the vehicle communication network 62 may be used for communications between devices represented as the computer 24 in this disclosure. Further, as mentioned below, various controllers and/or sensors may provide data to the computer 24 via the vehicle communication network 62.

The vehicle 12 may include at least one impact sensor 58 for sensing certain impacts to the vehicle 12, and a computer 24 in communication with the impact sensor 58 and the inflators 42. The computer 24 may activate the inflators 42, e.g., provide an impulse to a pyrotechnic charge of the inflators 42 when the impact sensor 58 senses certain impacts to the vehicle 12. Alternatively or additionally to sensing certain impacts, the impact sensor 58 may be configured to sense certain impacts prior to the certain impacts, i.e., pre-impact sensing. The impact sensor 58 may be in communication with the computer 24. The impact sensor 58 is configured to detect a certain impact to the vehicle 12. The impact sensor 58 may be of any suitable type, for example, post contact sensors such as accelerometers, pressure sensors, and contact switches; and pre-impact sensors such as radar, LIDAR, and vision sensing systems. The vision sensing systems may include one or more cameras, CCD image sensors, CMOS image sensors, etc. The impact sensor 58 may be located at numerous points in or on the vehicle 12.

The assembly 10 may include occupancy sensors 60 to identify whether an occupant is seated in one or more of the seats 14. The computer 24 may be in communication with the occupancy sensors 60. The occupancy sensors 60 may be coupled to the seats 14 to identify when an occupant is seated in the seats 14. As an example, the occupancy sensors 60 may indicate to the computer 24 that the seat 14 is occupied. For example, the occupancy sensor 60 may communicate to the computer 24, e.g., by sending a signal to the computer 24, that the seat 14 is occupied and in the absence of such communication the computer 24 may classify the seat 14 as unoccupied. As another example, the occupancy sensor 60 may be configured to communicate to the computer 24 that the seat 14 is occupied when the seat 14 is occupied and to communicate to the computer 24 that the seat 14 is unoccupied when the seat 14 is unoccupied, e.g., by sending a signal to the computer 24 when the seat 14 is occupied and unoccupied indicating occupancy or lack thereof.

The occupancy sensor 60 may determine the size of the occupant seated in the seat 14 when the seat 14 is determined to be occupied. The size of the occupant may be determined relative to the location of the occupant's head to the occupant head areas 34, 36. The occupancy sensor 60 may determine, for example, the height or weight of the occupant in the seat 14. As an example, the occupancy sensors 60 may determine a larger occupant, i.e., taller occupant, is seated in the seat 14 if the head of the occupant is determined to be in the first occupant head area 34. As another example, the occupancy sensors 60 may determine a smaller occupant, i.e., a shorter occupant, is seated in the seat 14 if the head of the occupant is determined to be in the second occupant head area 36.

The occupancy sensor 60 may be, for example, a weight sensor, image detection, a buckled seatbelt, etc. The vehicle 12 may include any suitable number of occupancy sensors 60. For example, the vehicle 12 may include a number of occupancy sensors 60 equal to the number of seats 14 in the vehicle 12. Specifically, in the examples shown in the Figures, all seats 14 in the vehicle 12 may each include an occupancy sensor 60.

Figure 7:
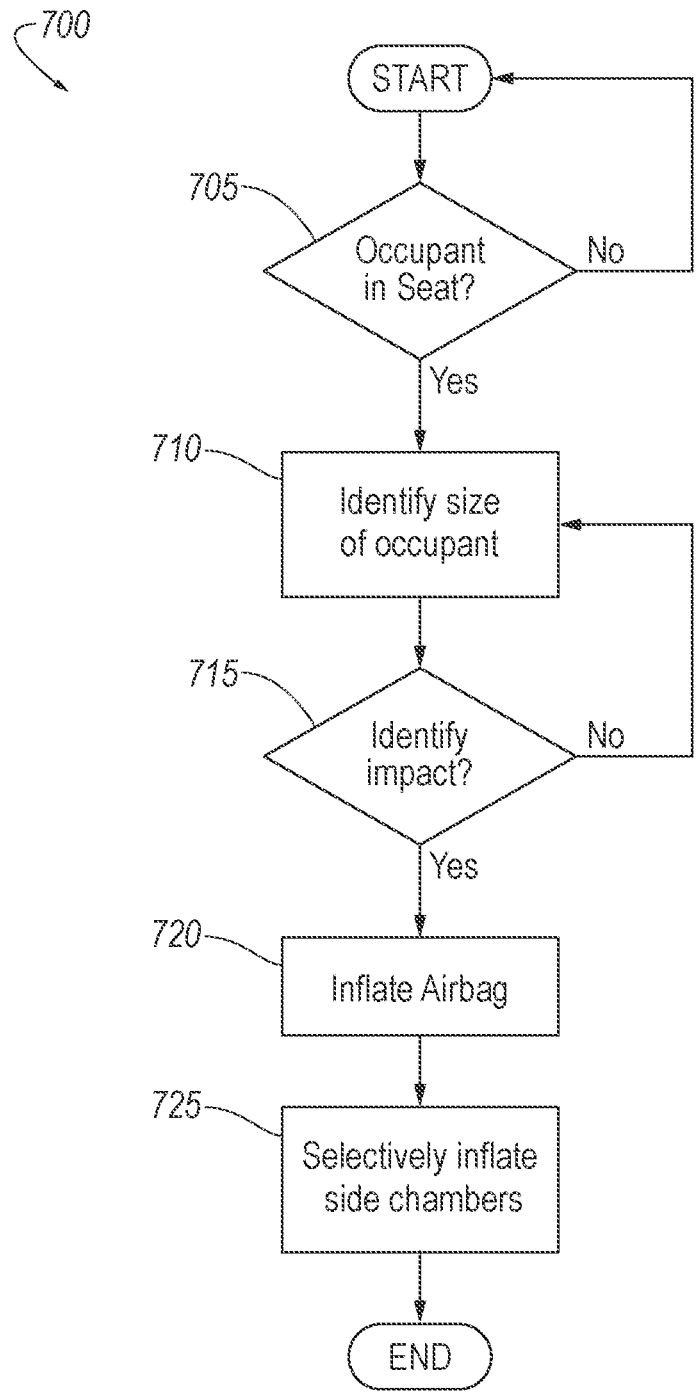
FIG. 7 is a flowchart of a method executed by a computer on the vehicle communication network.

With reference to FIG. 7, the vehicle 12 computer 24 stores instructions to control components of the vehicle 12 according to the method 700. Specifically, as shown in FIG. 7, the method 700 includes to selectively inflate one of the first side chamber 20 or the second side chamber 22 based on a determination of the size of the occupant of the seat 14. Use of "in response to," "based on," and "upon determining" herein indicates a causal relationship, not merely a temporal relationship.

With reference to decision block 705, the method 700 includes to identify an occupant is seated in the seat 14. The occupancy sensor 60 may notify the computer 24 that an occupant is seated in the seat 14, such as by sending a signal or lacking sending a signal. If no occupant is determined to be seated in the seat 14, the method 700 returns to its start. If an occupant is determined to be seated in the seat 14, the method 700 moves to decision block 710.

With reference to block 710, based on determining the seat 14 is occupied, the method 700 includes determining the size of the occupant of the seat 14. The occupancy sensors 60 may send a signal notifying the computer 24 of the size of the occupant in the seat 14. The size of the occupant may be stored by the computer 24 to be used to determine which of the side chambers 20, 22 to selectively inflate.

With reference to decision block 715, the method 700 includes identification of a certain vehicle impact, e.g., certain far-side impact. The impact sensors 58 may identify whether a certain vehicle impact has occurred. If a certain vehicle impact is identified, the method 700 moves to block 720. If no certain vehicle impact is identified, the method 700 returns to block 710.

With reference to block 720, based at least on identification of the certain vehicle impact, the method 700 includes inflating the airbag 16 to the inflated position. The computer 24 may send a signal to the inflator 42 to move the airbag 16 to the inflated position.

With reference to block 725, based on the identification of the size of the occupant that was stored by the computer 24 and the identification of the certain vehicle impact, the method 700 includes selectively inflating one of the first side chamber 20 or the second side chamber 22. Block 725 includes selectively releasing one of the first tether 50 or the second tether 52 by selectively activating the first tether release 54 or the second tether release 56. Depending on the size of the occupant of the seat 14, either the first side chamber 20 or the second side chamber 22 moves to the inflated position.

The disclosure has been described in an illustrative manner, and it is to be understood that the terminology which has been used is intended to be in the nature of words of description rather than of limitation. The numerical adjectives "first" and "second" are used herein merely as identifiers and do not signify order or importance. Many modifications and variations of the present disclosure are possible in light of the above teachings, and the disclosure may be practiced otherwise than as specifically described.

What is claimed is:

1. An assembly comprising:
a vehicle seat;
an airbag supported by the vehicle seat and inflatable to an inflated position, the airbag having a main chamber, a first side chamber, and second side chamber spaced downwardly from the first side chamber in the inflated position; and
a computer including a processor and a memory storing instructions executable by the processor to:
determine a size of an occupant seated in the vehicle seat; and
based on the size of the occupant, selectively inflate either one of the first side chamber from an uninflated position to an inflated position or the second side chamber from an uninflated position to an inflated position.

2. The assembly of claim 1, further comprising an inflator in fluid communication with the main chamber, the first side chamber, and the second side chamber.

3. The assembly of claim 2, further comprising a first tether between the inflator and the first side chamber and a second tether between the inflator and the second side chamber, the first tether and the second tether each being selectively releasable.

4. The assembly of claim 3, wherein the instruction further include to:
identify certain vehicle impacts; and
based on the identification of the vehicle impact, selectively release either the first tether or the second tether.

5. The assembly of claim 3, further comprising a first tether release coupled to the first tether and a second tether release coupled to the second tether and the instructions further include to, based on the size of the occupant, selectively activate either one of the first tether release or the second tether release.

6. The assembly of claim 3, further comprising a first tunnel between the inflator and the first side chamber and a second tunnel between the inflator and the second side chamber, the first tether being coupled to the first tunnel and the second tether being coupled to the second tunnel.

7. The assembly of claim 1, wherein the first side chamber and the second side chamber are seat-inboard of the main chamber when the first side chamber or the second side chamber are in the inflated position.

8. The assembly of claim 1, wherein the main chamber is elongated along an axis in the inflated position, the first side chamber and the second side chamber being spaced from each other along the axis.

9. The assembly of claim 8, wherein the first side chamber and the second side chamber are inflatable transverse to the axis.

10. The assembly of claim 1, wherein the first side chamber and the second side chamber are inflatable away from the main chamber.

11. The assembly of claim 1, wherein the first side chamber is in the inflated position when the second side chamber is in the uninflated position and the second side chamber is in the inflated position when the first side chamber is in the uninflated position.

12. The assembly of claim 1, wherein the vehicle seat defines an occupant seating area, the first side chamber and the second side chamber being inflatable between the main chamber and the occupant seating area.

13. The assembly of claim 12, wherein the vehicle seat includes a pair of bolsters spaced cross-seat from each other and the occupant seating area being between the bolsters, the airbag being supported at one of the bolsters.

14. The assembly of claim 1, wherein the vehicle seat defines a first occupant head area and a second occupant head area, the first side chamber being inflatable between the main chamber and the first occupant head area and the second side chamber being inflatable between the main chamber and the second occupant head area.

15. The assembly of claim 1, wherein the vehicle seat includes a seatback, the airbag being supported by the seatback.

16. The assembly of claim 1, further comprising a second vehicle seat spaced cross-vehicle from the vehicle seat, the airbag being inflatable between the vehicle seat and the second vehicle seat.

* * * * *